United States Patent [19]

Stroud

[11] Patent Number: 5,562,326
[45] Date of Patent: Oct. 8, 1996

[54] PERSONAL BODY RESTRAINT DEVICE

[76] Inventor: Robert W. Stroud, 9000 E. Memorial, Jones, Okla. 73049

[21] Appl. No.: 262,966

[22] Filed: Jun. 21, 1994

[51] Int. Cl.$^6$ .................................................. B60R 21/00
[52] U.S. Cl. .......................................... 297/465; 297/485
[58] Field of Search ................................... 297/465, 464, 297/485, 482, 463.1; 182/3, 81; 244/151 R, 151 B, 151 A

[56] References Cited

U.S. PATENT DOCUMENTS

| | | | |
|---|---|---|---|
| 1,616,349 | 2/1927 | Cagle . | |
| 2,170,703 | 8/1939 | Waxman et al. | 297/465 X |
| 2,372,557 | 3/1945 | Dowd | 244/151 R |
| 2,442,119 | 5/1948 | Drozinski | 244/151 B X |
| 2,544,399 | 3/1951 | Schneider | 244/151 B X |
| 2,940,443 | 6/1960 | Baker | 297/465 X |
| 3,034,596 | 5/1962 | Twaitz, Jr. | 182/3 |
| 3,178,223 | 4/1965 | Martin | 244/151 R X |
| 3,179,360 | 4/1965 | Shelton et al. | 297/465 X |
| 3,473,201 | 10/1969 | Hopka et al. | 244/151 R |
| 3,524,679 | 8/1970 | De Lavenne | 297/465 |
| 3,757,744 | 9/1973 | Pravaz | 182/3 |
| 3,936,092 | 2/1976 | Dietz | 297/465 |
| 4,063,778 | 12/1977 | Chika | 297/465 |
| 4,226,474 | 10/1980 | Rupert et al. | 297/465 X |
| 4,437,628 | 3/1984 | Schwartz | 244/122 |
| 4,682,671 | 7/1987 | Hengstenberger et al. | 182/3 |
| 4,685,454 | 8/1987 | Posey | 297/465 X |
| 4,738,413 | 4/1988 | Spinosa et al. | 244/151 R |
| 4,939,824 | 7/1990 | Reed | 297/482 X |

FOREIGN PATENT DOCUMENTS

| | | | |
|---|---|---|---|
| 593924 | 3/1960 | Canada | 244/151 R |
| 948949 | 2/1964 | United Kingdom | 297/480 |

Primary Examiner—Milton Nelson, Jr.
Attorney, Agent, or Firm—Craig W. Roddy

[57] ABSTRACT

A device for restraining a person sitting in a seat, wherein the impact load of a person during an accident is substantially and evenly distributed over the anterior torso of the user's body for protection thereof. The device includes a torso cover which is connected to a seat using a plurality of attachments. Each attachment is connected to a release which manually actuates the simultaneous disconnection of each attachment, thereby allowing the person to quickly exit from the seat.

20 Claims, 6 Drawing Sheets

PERSONAL BODY RESTRAINT DEVICE

BACKGROUND

The present invention relates generally to a personal body restraint device, and more particularly, to a device for restraining a person in a seat.

Seat restraint devices are commonly used to protect people from injury during accidents, such as an automobile accident. It is known that auto race drivers require tremendous personal body restraint to minimize impact load during an accident. Many race cars use a plurality of seat belts for personal body restraint; however, belts can cause personal injury during an accident because the impact load of the person's body is confined to a limited area of the torso.

It is desirable for a seat restraint device to have a means for instantly releasing the user from the seat. However, known releases are unadaptable for use with the present invention which has a plurality of individual attachments. Therefore, no personal body restraint device exists which can substantially distribute impact load over the user's anterior torso and provide a single release means for quickly releasing the user therefrom.

For the foregoing reasons there is a need for a simple, economical and effective personal body restraint device which spreads impact load over a substantial portion of the person's anterior torso and provides a means for quickly releasing the user; however, until now, no such device has been developed.

SUMMARY

The embodiment of the invention is directed to a device for satisfying the need of providing a personal body restraint which substantially distributes impact load over the user's anterior torso and provides a release to instantly free the user from the seat.

When a person such as an auto race driver is involved in an accident, the impact load of the person is exerted against the seat restraint device. If the restraint device distributes impact load over a limited portion of the person's body it is more likely that the person will be injured. However, personal injury is prevented with use of the present embodiment of the invention.

The present version of the invention relates to a personal body restraint device for a person sitting in a seat, such as an automobile seat. More specifically, the device comprises a torso cover which is placed over the anterior torso of the person's body, wherein the person is positioned between the seat and the torso cover. The torso cover is preferably connected to the seat with five metal-to-metal type attachments including: two attachments generally near the person's shoulders, two attachments generally near the person's hips, and one attachment generally near the person's crotch.

A release is attached to the device for simultaneously detaching each of the individual attachments. Additionally, in an alternative embodiment, the torso cover includes a total of seven attachments used for attaching the torso cover to the seat at seven individual attachment points. The alternative embodiment includes the five attachments as previously described and two additional attachments generally located under the user's arms. The two additional attachments are likewise attached to the release, wherein the seven attachments are simultaneously disengaged by the release for detaching the torso cover from the seat.

As such, it is a first object of the embodiment of the invention to provide a personal body restraint device which substantially and evenly distributes impact load over the user's anterior torso to provide an effective and non-injurious means of restraining a person in a seat.

It is a further object of the embodiment of the invention to provide a personal body restraint device which has a torso cover that is connectable to a seat via a plurality of attachments.

It is a further object of the embodiment of the invention to provide a personal body restraint device which allows the user to quickly exit from the seat.

It is a further object of the embodiment of the invention to provide a personal body restraint device which provides a single release for simultaneously disconnecting each attachment.

It is a further object of the embodiment of the invention to provide a personal body restraint device which enables a person other than the user to instantly release the attachments.

It is a further object of the embodiment of the invention to provide a personal body restraint device having a torso cover which may be worn by the user while not sitting in the seat.

It is a further object of the embodiment of the invention to provide a personal body restraint device which reduces slippage and provides lateral restraint for the user's body.

It is a further object of the embodiment of the invention to provide a personal body restraint device which is adjustable and provides comfort to the user.

It is a further object of the embodiment of the invention to provide a personal body restraint device which provides substantial restraint and sternum support for the user's body.

It is a final object of the embodiment of the invention to provide a personal body restraint device which is made of fire resistant materials.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

Figure 1:
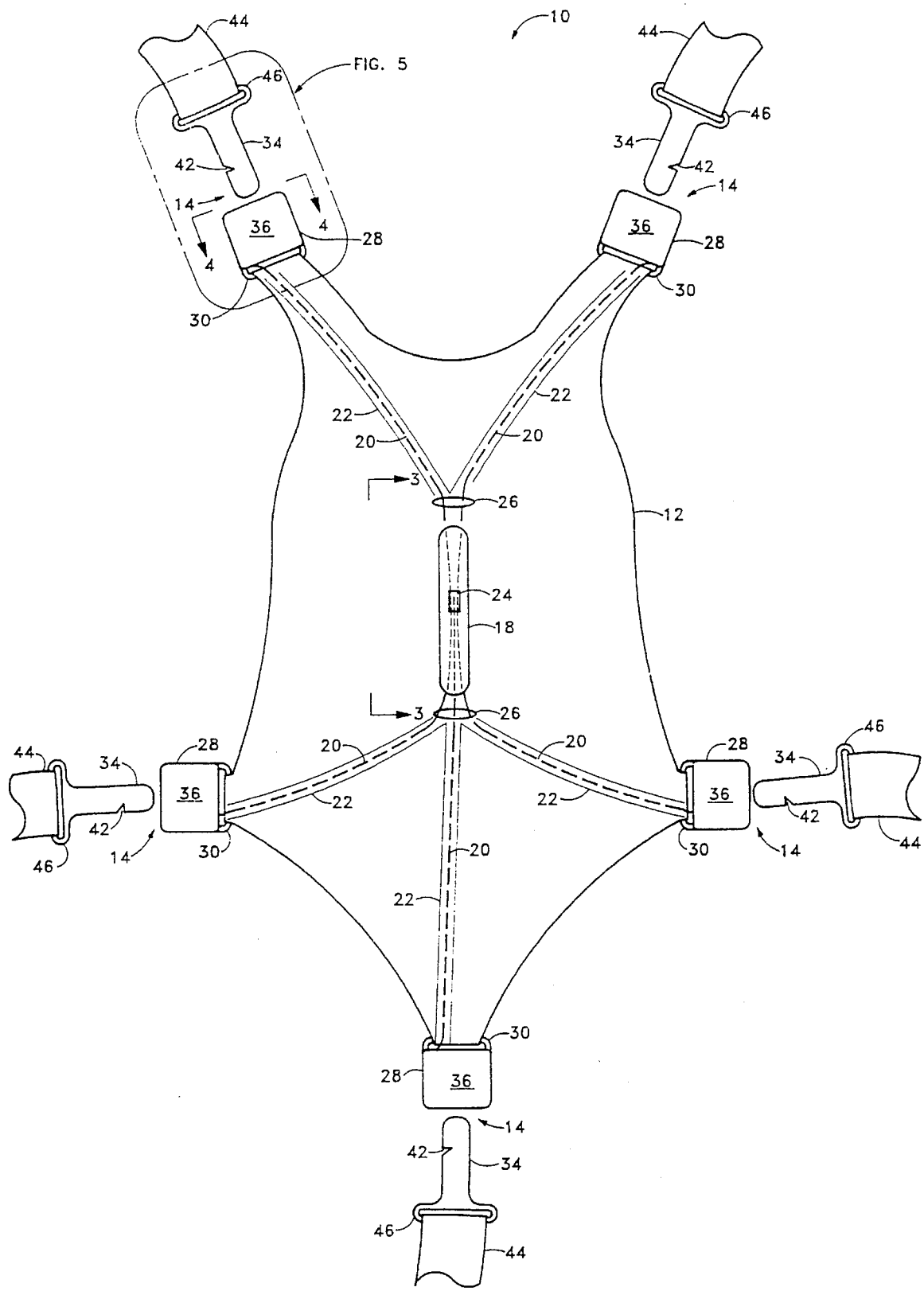
FIG. 1 is a front elevation view of the restraint device constructed in accordance with the present embodiment of the invention.

As best illustrated in FIG. 1, the present embodiment of the invention relates to a device 10 for restraining a person in a seat (not illustrated) of a motor vehicle such as a commonly known race car. The device 10 contains a torso cover 12 which is connected to the seat using a plurality of attachments 14 which will be further discussed herein.

The torso cover 12 is preferably made of a pliable fire resistant fabric such as "NOMEX" or "PROBAN". When a person is sitting in the seat, the torso cover 12 substantially covers the anterior torso of the person's body, wherein the person is positioned between the seat and the torso cover 12.

Figure 2:
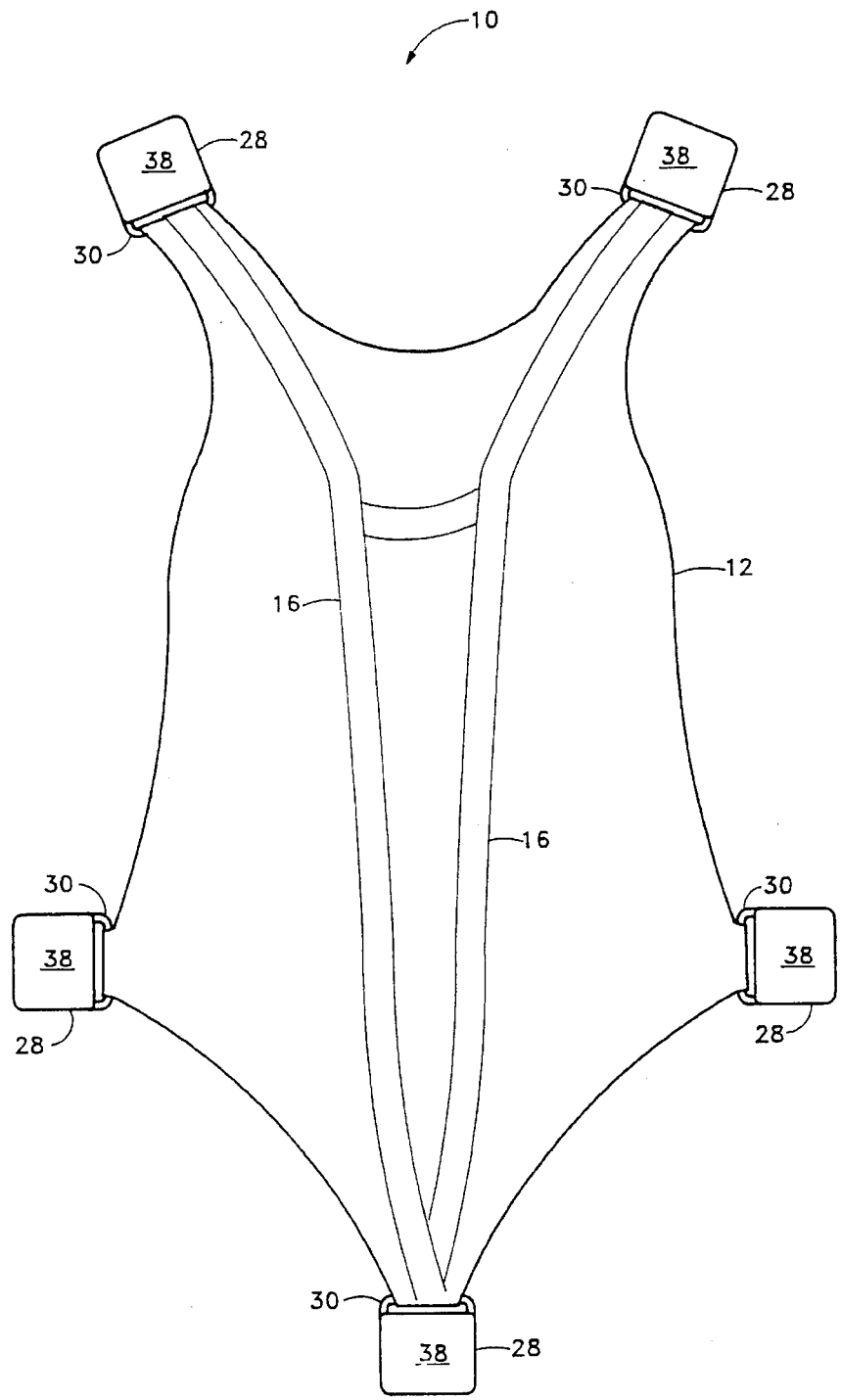
FIG. 2 is a back elevation view of the restraint device shown in FIG. 1.

As shown in FIG. 2, the torso cover 12 includes a pair of straps 16 which are connected to the torso cover 12 and generally extend around the person's back during use. The straps 16 hold the torso cover 12 on the person's body whenever the device 10 is detached from the seat. Preferably, the straps 16 are made of a fire resistant fabric similar to that utilized in constructing the torso cover 12.

Referring again to FIG. 1, the torso cover 12 has five attachments 14, such as attachment buckles, individually affixed thereto for attaching the torso cover 12 to the seat. The five attachments 14 include two attachments generally near the person's shoulders, two attachments generally near the person's hips and one attachment generally near the person's crotch.

Figure 3:
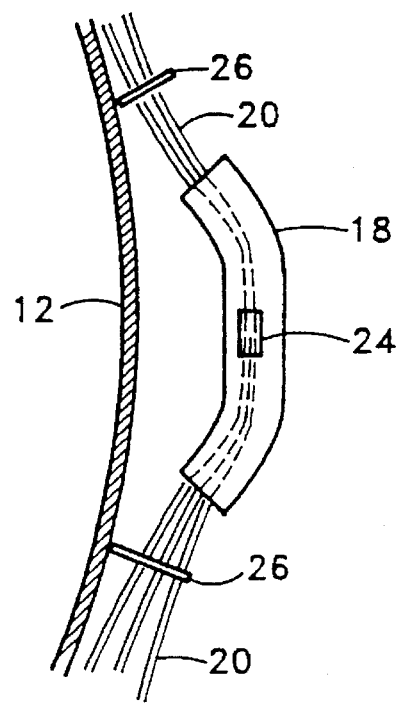
FIG. 3 is a partial section view taken along line 3—3 of FIG. 1.
Figure 4:
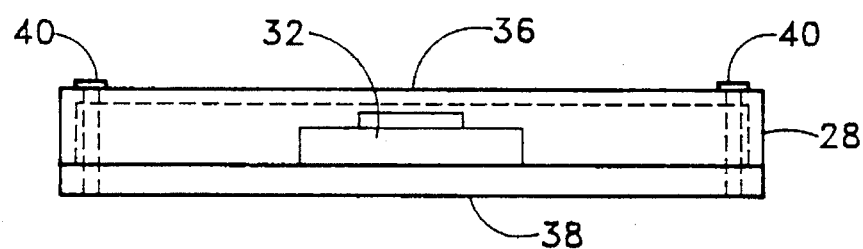
FIG. 4 is a view taken along line 4—4 of FIG. 1.

Preferably, the attachments 14 are connected to a single release 18, such as a handle shown in FIGS. 1 and 3, which synchronously actuates the disengagement of the attachments 14. In the present embodiment of the invention, each attachment 14 has one cable 20 connected thereto, wherein all of the cables 20 are coupled together within the release 18.

The cables 20 are generally held adjacent the torso cover 12 with a fabric such as nylon webbing, which substantially forms a separate passage 22 for each cable 20. The individual passages 22 generally extend from near the attachments 14 to near the release 18, whereby each cable 20 is slidably positioned within one passage 22 to provide communication between the release 18 and the joined attachment 14.

Again in FIGS. 1 and 3, the release 18 is centrally located on the torso cover 12 and can be manually pulled away from the person's body to actuate the disengagement of the attachments 14. Further, it is preferred that the release 18 be positioned such that another person can easily access it to free the user from the seat if necessary.

The release 18 is preferably foam covered to prevent injury to the user and has two opposed ends through which the cables 20 are accepted therein. The cables 20 are coupled together within the release 18 using a cable clamp 24 known in the art.

A control ring 26 is provided near each end of the release 18 for controlling the pull-rate of the cables 20 as they pass therethrough. The control rings 26 are attached to the torso cover 12 with stitching or other means known in the art. Wherefore, as the release 18 is pulled away from the person's body, the cables 20 are evenly drawn to initiate a synchronized detachment of the attachments 14.

As shown in FIGS. 1, 4, 5 and 6 each attachment 14 includes a housing 28. Connected to the housing 28 is a loop 30 which has a portion of the torso cover 12 received therethrough. The torso cover 12 material is lapped through the loop 30 and attached to itself by a known fastening means such as stitching or riveting; thus, the housing 28 is securely affixed to the torso cover 12.

Located on the housing 28 opposite the loop 30 is an opening 32 for receiving a bayonet member 34 therein. The housing 28 has top and bottom sides 36, 38 which are held together with fasteners 40 such as rivets, screws, bolts or other fastening means known in the art.

Figure 5:
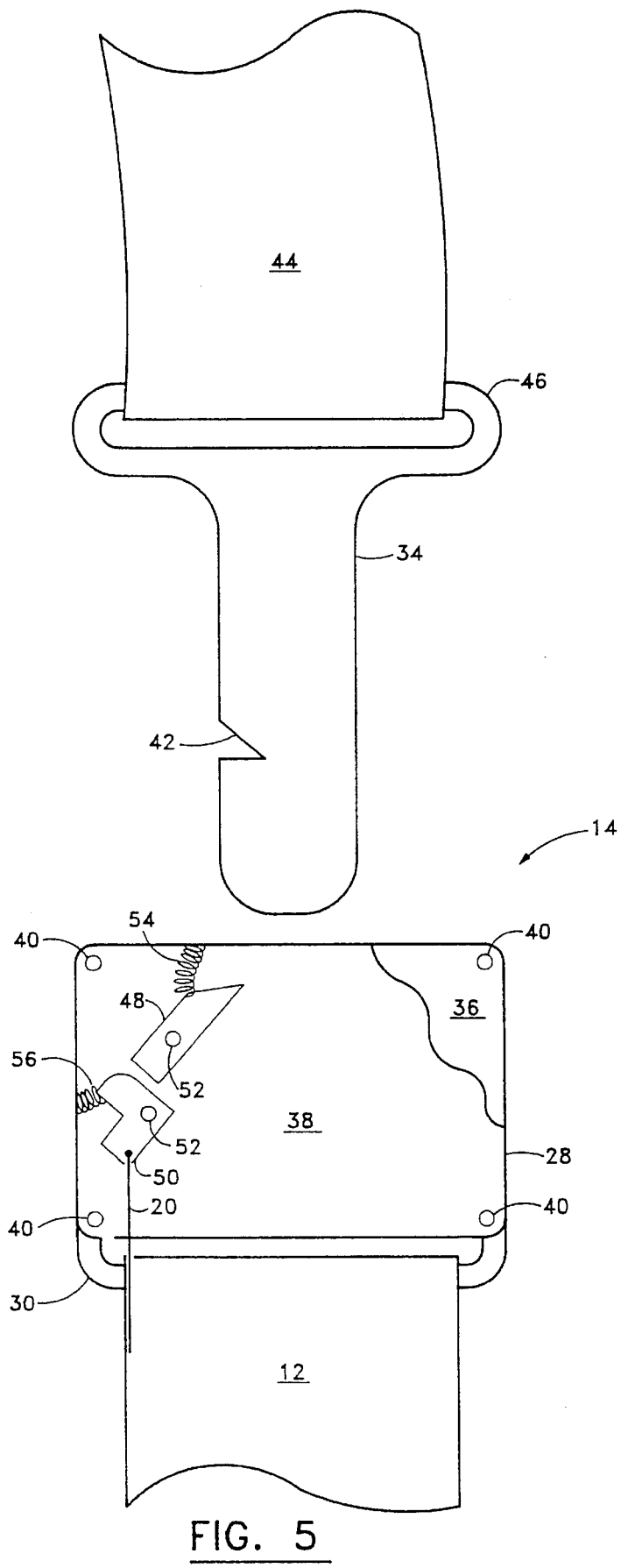
FIG. 5 is an enlarged front elevation view of the unengaged attachment shown in FIG. 1.
Figure 6:
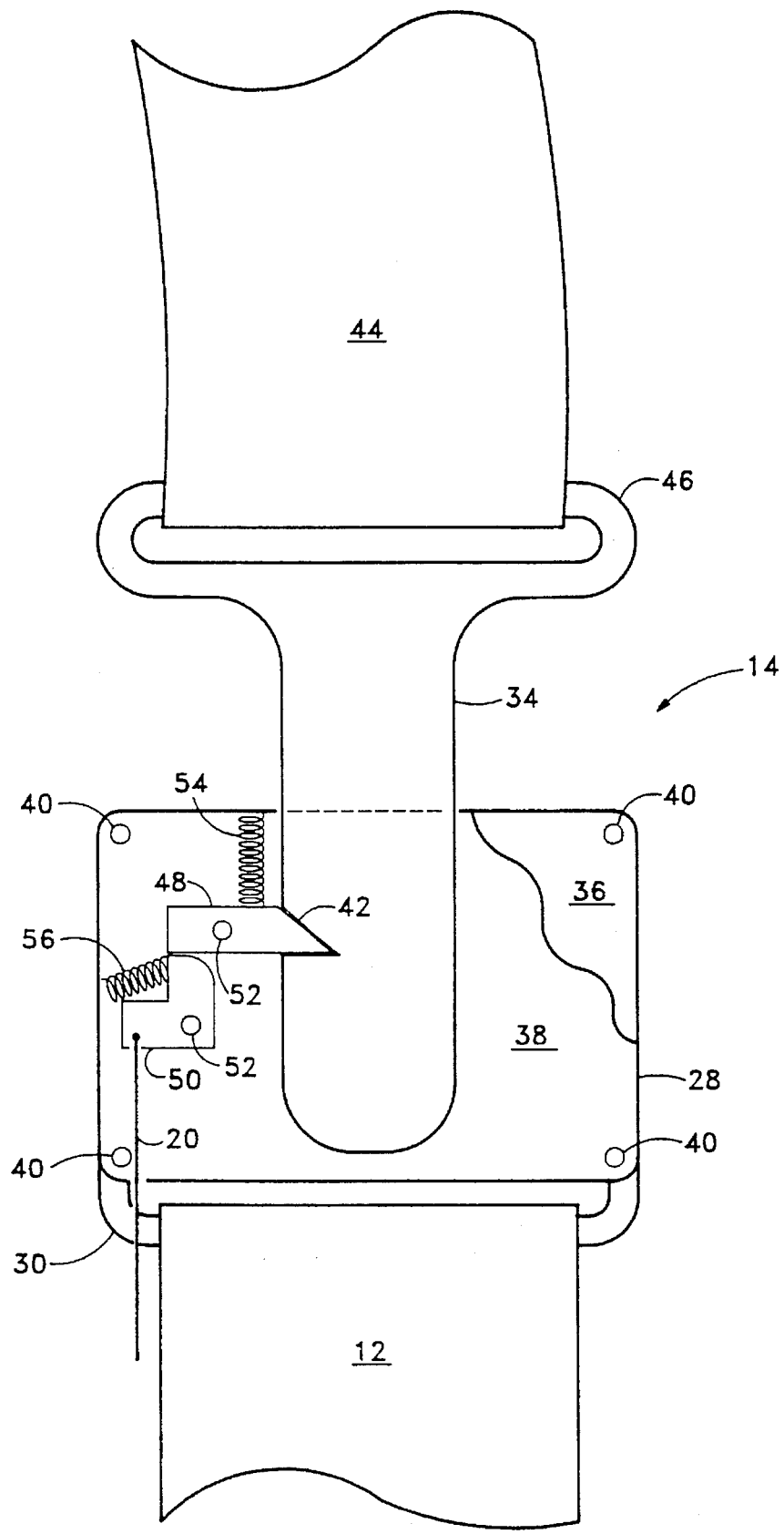
FIG. 6 is the attachment of FIG. 5 in the engaged position.

In FIGS. 5 and 6, the attachment 14 is shown including the housing 28 and bayonet member 34. The bayonet member 34 is somewhat elongated with a single notch 42 thereon and is attached to the seat with a pliable material 44 such as that commonly used to construct seat belt restraints. The material 44 is lapped through a loop 46 defined on the bayonet member 34 and is attached to itself by a known fastening means such as stitching or riveting. Furthermore, the material 44 is connected to the seat by means commonly used in the art for attaching known belt restraint devices thereto.

The housing 28 contains first and second cams 48, 50 attached therein by pivot pins 52 which are mounted to the bottom side 38. Preferably, the pins 52 are stainless steel rivets while the housing 28, bayonet member 34 and cams 48, 50 are likewise made of a metal such as steel which can withstand the stress of an impact.

The first cam 48 is somewhat elongated with an acute end and is attached to a first spring 54 for pulling the cam 48 towards the housing 28. The second cam 48 is somewhat L-shaped and is attached to a second spring 56 which pushes the cam 50 away from the housing connected thereto. In addition, the cable 20 is connected to the second cam 50 for actuating movement thereof, wherein the cam 54 is pulled against the spring 56 as shown in FIG. 5.

In FIGS. 5 and 6, it is seen that the bayonet member 34 is received into the housing 28 through the opening 32, whereby the first cam 48 is pulled against the first spring 54 and moves along the bayonet member 34 until the acute end thereof is received into the notch 42. As the first cam 48 is received in the notch 42 of the bayonet member 34, the cam 48 is firmly positioned against the second cam 50 for engaging the attachment 14; thus, securely attaching the torso cover 12 to the seat.

The first cam 48 remains engaged with the bayonet member 34 until the release 18 is used to pull the cable 20. As the cable 20 is pulled, the second cam 50 is pulled away from the first cam 48 wherein the first cam 48 is withdrawn from the notch 42 to release the bayonet member 34. Hence, the bayonet member 34 may be removed from the housing 28 for quickly detaching the torso cover 12 from the seat.

Figure 7:
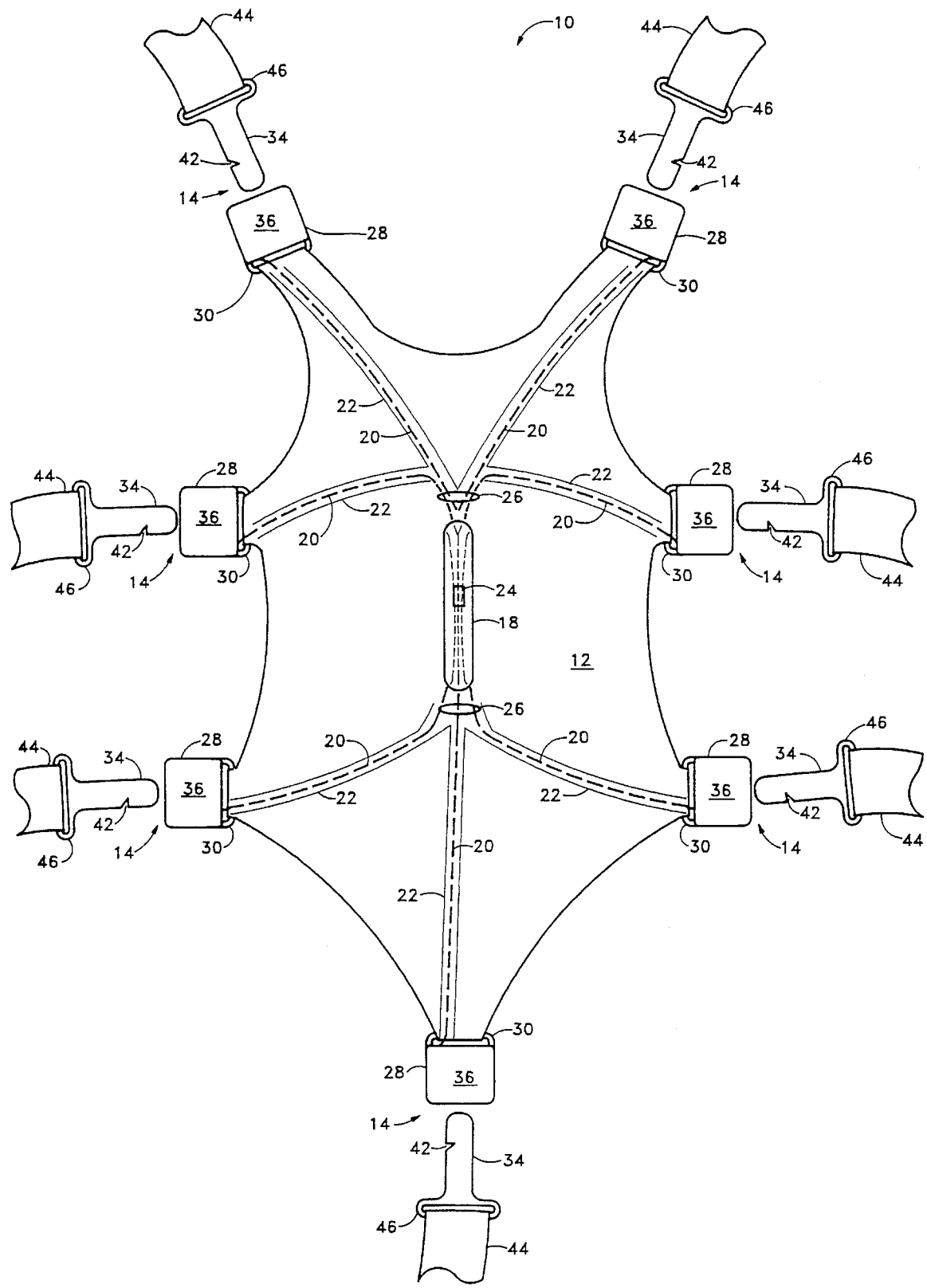
FIG. 7 is a front elevation view of an alternative embodiment of the restraint device.

In FIG. 7, an alternative embodiment of the invention includes the torso cover 12 having seven attachments 14 for attaching the torso cover 12 to the seat. In addition to the five attachments defined in the preferred version of the invention, two additional attachments 14 are added generally under the person's arms to provide added support and restraint to the user. The additional attachments function in conjunction with and in the same manner as the attachments 14 described in the preferred embodiment. Therefore, all of the attachments 14 on the alternative embodiment are simultaneously detached via the release 18.

Operation of the device 10 is initiated by placing the torso cover 12 on the anterior portion of the user's body. The straps 16 being extended around the user's posterior torso for holding the torso cover 12 on the user's body.

When the user is positioned in the seat, the attachments 14 are manually coupled with the bayonet members 34 such that the user is positioned between the seat and the torso cover 12. The torso cover 12 is securely adjusted using three bar type adjustments (not illustrated) known in the art. The adjustments are located on the material 44 which connects the bayonet members 34 to the seat.

Subsequently, in detaching the torso cover 12 from the seat, the release 18 is manually pulled away from the user's body to simultaneously disengage the attachments 14. As the cables 20 disengage the cams 48, 50, the bayonet members 34 are released wherein the user can exit from the seat while wearing the torso cover 12. Furthermore, the torso cover 12 and straps 16 may be used by another person to assist the user in exiting the seat after being detached therefrom.

The previously described versions of the invention have many advantages, including a simple and economic way of restraining a person in a seat. The device 10 substantially and evenly distributes impact load over the user's body to protect against injury. Another advantage of the embodiment of the invention is that the device 10 is quickly detached from the seat with the use of a manual release 18.

While the preferred use of the present version of the invention is for an automobile seat restraint device 10, it is obvious that the device 10 has many applications for restraining a person in a seat. Therefore, the foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A device for restraining a person in a seat, comprising:

a torso cover;

a plurality of attachments for attaching said torso cover to the seat;

a release;

a plurality of cables to provide communication between said attachments and said release;

wherein said torso cover has means for slidably receiving said cables therethrough;

wherein said release is used to pull said cables;

first means for controlling the pull-rate of said cables; and wherein a first plurality of said cables are received through said first means for controlling.

2. A device as described in claim 1, wherein:

said means for slidably receiving said cables includes said torso cover having passages.

3. A device as described in claim 1, wherein:

said means for slidably receiving said cables includes a fabric for holding said cables adjacent said torso cover.

4. A device as described in claim 1, wherein:

said means for slidably receiving said cables includes the device having individual passages which generally extend from near said attachments to near said release.

5. A device as described in claim 4, wherein:

each of said cables is positioned within one of said individual passages.

6. A device as described in claim 1, wherein:

said first means for controlling includes a first control ring having the first plurality of said cables slidably received therethrough.

7. A device as described in claim 6, wherein:

said first control ring has an opening for receiving the first plurality of said cables therethrough.

8. A device as described in claim 1, further comprising:

second means for controlling the pull-rate of said cables wherein a second plurality of said cables are received through said second means for controlling.

9. A device as described in claim 8, wherein:

said first and second means for controlling are located adjacent opposed ends of said release.

10. A device as described in claim 8, wherein:

said second means for controlling includes a second control ring having the second plurality of said cables slidably received therethrough.

11. A device as described in claim 10, wherein:

said second control ring has an opening for receiving the second plurality of said cables therethrough.

12. A device for restraining a person in a seat, comprising:

a torso cover;

a plurality of attachments for attaching said torso cover to the seat;

a release;

a plurality of cables to provide communication between said attachments and said release;

wherein said torso cover has integrally contained passages for slidably receiving said cables; and a first control ring having a first plurality of said cables slidably received therethrough.

13. A device as described in claim 12, wherein:

said first control ring has an opening for receiving the first plurality of said cables therethrough.

14. A device as described in claim 12, further comprising:

a second control ring having a second plurality of said cables slidably received therethrough.

15. A device as described in claim 14, wherein:

said first and second control rings are located adjacent opposed ends of said release.

16. A device as described in claim 12, wherein:

said passages include the device having a fabric for holding said cables adjacent said torso cover.

17. A device for restraining a person in a seat, comprising:

a torso cover;

a plurality of attachments for attaching said torso cover to the seat;

a release;

a plurality of cables to provide communication between said attachments and said release;

wherein said release is used to pull said cables; and means for controlling the pull-rate of said cables, wherein said means for controlling includes a first control ring having a first plurality of said cables slidably received therethrough and a second control ring having a second plurality of said cables slidably received therethrough.

18. A device as described in claim 17, wherein:

said first control ring has an opening for receiving the first plurality of said cables therethrough.

19. A device as described in claim 17, wherein:

said first and second control rings are located adjacent opposed ends of said release.

20. A device as described in claim 17, wherein:

the device includes a fabric for holding said cables adjacent said torso cover.

* * * * *